T. J. SHEA.
METHOD OF JOINING PLATES OR THE LIKE.
APPLICATION FILED FEB. 5, 1921.
1,401,448.
Patented Dec. 27, 1921.
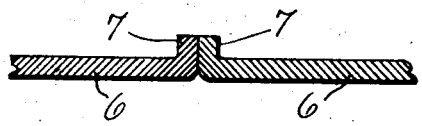
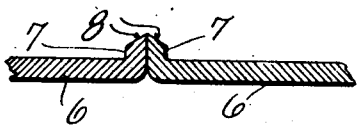
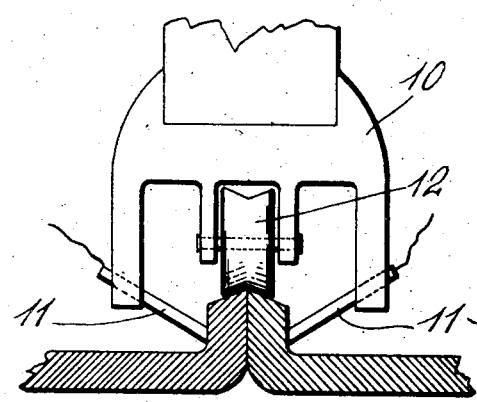
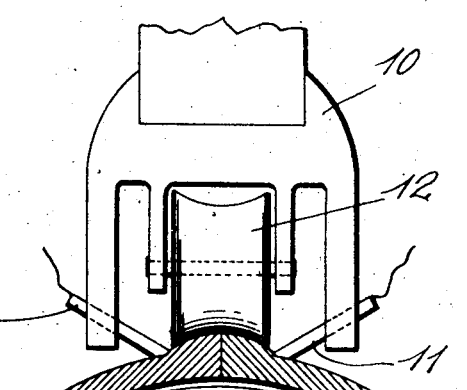
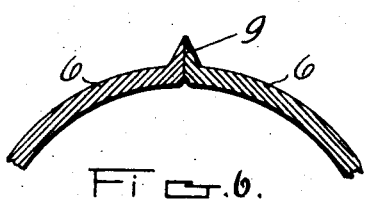
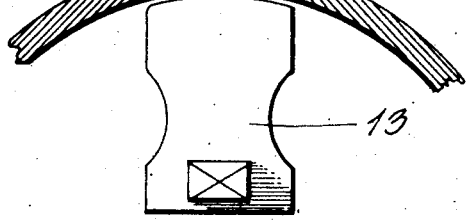
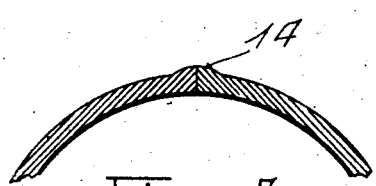
Inventor
Thomas J. Shea
By Geo. E. Tew
Attorney

UNITED STATES PATENT OFFICE.

THOMAS J. SHEA, OF PORTLAND, OREGON.

METHOD OF JOINING PLATES OR THE LIKE.

1,401,448.   Specification of Letters Patent.   Patented Dec. 27, 1921.

Application filed February 5, 1921. Serial No. 442,751.

*To all whom it may concern:*

Be it known that I, THOMAS J. SHEA, citizen of the United States, residing at Portland, in the county of Multnomah and State of Oregon, have invented certain new and useful Improvements in Methods of Joining Plates or the like, of which the following is a specification.

This invention relates to a method of joining plates or the edges thereof by means of electric welding, and it is particularly applicable to the formation of welded seams in tanks, ships, barges, pipes and other metal products, the operation being such that the welding tool is applied to both sides of the seam at the same side of the plates or stock to be welded, whereby it will not be necessary to apply electric tools or terminals to opposite sides of the plates, as with a lapped seam or the like. This result is effected by upsetting flanges in the same direction at the meeting edges of the plates, and then butting the outer sides of these flanges, and then applying the welding tool with its terminals at opposite sides of the rib or seam thus formed. I also preferably apply pressure to the seam during the welding operation, for swaging or smoothing it down, the pressure being applied to the edge of the seam between the electrodes, and to assist in making a small seam the edges of the flanges are beveled either on the outside or on the inside, to reduce the metal and to assist in making a good joint. The advantages of applying the tool to only one side of the structure will be apparent in pipe work, where it is impossible to get at the seam from the inside, and also in ship and tank work where it is inconvenient to do so, or requires two men to locate the welding tools.

Several forms of the invention are illustrated in the accompanying drawings. Figure 1 is a section of two plates with the edges upset and butted. Fig. 2 is a similar view of the edges beveled off at the outer side. Fig. 3 is a similar view of the edges drawn down or beveled on the inner or meeting sides. Fig. 4 is a view showing the formation of one of the flanges shown in Fig. 3. Fig. 5 is a view showing the welding tool applied to the seam shown in Fig. 2. Fig. 6 is a section of a longitudinal pipe seam with beveled flanges. Fig. 7 is a section of the same seam, finished. Fig. 8 is a view of the welding tool applied to the seam shown in Fig. 7. Fig. 9 is a detail in section of a circular or end pipe seam.

In one form of the invention, the edges of the plates 6 are upset on the same side to form flanges 7, and these flanges are butted at their outer sides to form what I term a flanged butt seam or joint. As shown in Fig. 2 the outer edges of the flanges 7 may be beveled off as shown at 8. In the forms shown in Figs. 3, 4 and 6, the meeting faces of the flanges, after being upset are beveled off as shown at 9, thereby forming a relatively sharp edge and reducing the metal considerably.

The flanges thus formed in one or the other of the ways indicated are then butted, and a welding tool is applied, said tool being indicated as a whole at 10 having electrodes or terminals 11 which engage in or about the corners of the flanges, or at opposite sides thereof, and by the passage of an electric current the flanges between the terminals are welded together, the tool being moved along the seam to make a continuous seam, or spotted along as in spot welding. This action is materially assisted by simultaneously applying pressure to the outer edges of the flanges, as by means of a wheel 12 carried by a welding tool and forced down against the seam with sufficient pressure to spread or swage the fluid metal during the welding operation, and an anvil or block 13 may be placed under or behind the seam if necessary. Thereby the seam can be pressed down to a small rib, as shown at 14 in Fig. 7. This is particularly desirable for pipe work. Or, the seam can be left standing as in Fig. 5.

By the means described a continuous welded seam can be produced much quicker and easier than with lapped seams requiring operations both inside and outside, and with some saving of metal, since the flanges need only be upset or drawn wide enough to allow for the application of electrodes to opposite sides of the standing flanges.

It is to be understood that the invention is not limited to the exact forms disclosed, and it may be practised in various modifications thereof.

I claim:

1. The method of joining plates, comprising upsetting the edges thereof to form marginal flanges, abutting said flanges, and electrically welding the flanges between a pair of electrodes, both of which are applied to the flanges on the same side of the plates.

2. The method of joining plates lying in substantially the same plane, comprising upsetting the edges thereof to form angular flanges, abutting said flanges, and passing an electric welding current through said flanges between a pair of electrodes both of which are applied to the flanges on the same side of the plates.

3. The method of joining plates, comprising upsetting the edges thereof to form marginal flanges, abutting said flanges, and electrically welding the flanges between a pair of electrodes both of which are applied to the flanges on the same side of the plates, and applying pressure to the edges of the flanges during the welding operation.

4. The method of joining plates, comprising upsetting the edges thereof to form flanges, beveling the edges of the flanges, abutting the flanges of the respective plates, and electrically welding the flanges between a pair of electrodes both of which are applied to the flanges on the same side of the plates.

5. The method of joining plates, comprising upsetting the edges thereof to form flanges, beveling the edges of the flanges, abutting the flanges of the respective plates, electrically welding the flanges between a pair of electrodes both of which are applied to the flanges on the same side of the plates, and swaging down the joint by applying pressure to the beveled edges of the flanges.

6. The method of joining plate edges, comprising upsetting flanges at the edges, beveling the outer faces of said flanges, abutting the beveled faces of the flanges, and electrically welding the flanges between a pair of electrodes both of which are applied to the flanges on the same side of the plates.

7. The method of joining plate edges, comprising upsetting flanges at the edges, beveling the outer faces of said flanges, abutting the beveled faces of the flanges, electrically welding the flanges between a pair of electrodes both of which are applied to the flanges on the same side of the plates and applying pressure to the outer edges of the flanges during the welding operation.

In testimony whereof, I affix my signature in presence of two witnesses.

THOMAS J. SHEA.

Witnesses:
F. E. THOMPSON,
GLENDORA S. THOMPSON.